United States Patent [19]

Bernard

[11] 4,393,710
[45] Jul. 19, 1983

[54] ELECTROSTATIC ACCELEROMETER

[75] Inventor: Alain M. Bernard, Fresnes, France

[73] Assignee: Office National d'Etudes et de Recherches Aerospatiales, Chatillon, France

[21] Appl. No.: 325,590

[22] Filed: Nov. 27, 1981

[30] Foreign Application Priority Data

Nov. 28, 1980 [FR] France ................. 80 25272

[51] Int. Cl.³ ............. G01P 15/125; G01P 15/13
[52] U.S. Cl. .................... 73/517 B; 308/10; 318/662
[58] Field of Search ......... 73/517 B; 364/453, 566; 308/10; 318/662

[56] References Cited

U.S. PATENT DOCUMENTS 3,438,267 4/1969 Contensou et al. ............. 73/517 B
3,742,767 7/1973 Bernard et al. ................ 73/517 B

FOREIGN PATENT DOCUMENTS 2124055 9/1972 France ................. 73/517 B

Primary Examiner—James J. Gill
Attorney, Agent, or Firm—Lowe, King, Price & Becker

[57] ABSTRACT

Electrostatic accelerometer comprising an electrically conducting test weight freely floating in a cage and a system of electrodes located in said cage at the points where the axes of a coordinate tri-rectangular trihedral meet the cage. The electrodes are associated by pairs located along a given coordinate axis and form with the test weight pairs of variable capacitors. Two capacitor bridges including the variable capacitors give the sum and difference of the capacities of these variable capacitors and adder subtractor means gives the individual values of these capacities. The accelerometer further comprises means for calculating the gradients of the measured capacities of a pair of electrodes, means for squaring the positioning control signals relating to said pair of electrodes, and means for multiplying said gradient by said squared signals.

9 Claims, 6 Drawing Figures

ELECTROSTATIC ACCELEROMETER

BACKGROUND OF THE INVENTION

1. Field of the Invention

This invention concerns those accelerometers in which the acceleration measurement is deduced from that of the forces required to hold a test weight still or bring it back to a position defined with respect to the body of the apparatus. It concerns more particularly those accelerometers where these forces are electrostatically produced and is intended to perfect them with a view to enhancing their accuracy.

2. Description of the Prior Art

U.S. Pat. No. 3,438,267 issued Apr. 15, 1969 described a capacitive microaccelerometer comprising a spherical conducting ball, relatively light, housed in a substantially spherical cage and freely floating in the cage where the diameters of the cage and the ball differ only very little. Inserted in the spherical cage are a number of electrodes insulated from the cage wall. There are twelve in all. Six of them are flat-dome shaped, polar electrodes arranged around poles where three tri-rectangular axes originating from the center of the spherical cage meet the cage wall and the other six are spherical rings surrounding and insulated from the spherical domes. The polar electrodes detect the position of the ball whilst the circumpolar electrodes control the positioning of the ball. The polar electrodes are fed by an alternating current source and, with the conducting ball when displaced by acceleration force effects, form a variable capacitor whose capacity depends on the ball position. Since the ball is free in the cage, its potential is capacitively fixed through a capacitor set up between its own surface and that of the cage wall not taken up by the polar and circumpolar electrodes; the capacity of this capacitor is relatively high and the impedance consequently low. The signals picked up between two given diametrically-opposed polar electrodes are detected, amplified and fed in the appropriate direction into the two circumpolar electrodes associated with the two given polar electrodes. A three-component ball position closed-loop control system is thus created wherein the signals applied to the three circumpolar electrode pairs respectively measure the components of acceleration applied to the ball.

In French Pat. No. 2 124 055 of Feb. 2, 1971, a polar electrode and two circumpolar electrodes, all coaxial, are arranged in the vicinity of each pole of the test ball. The nearest circumpolar electrode of the polar electrode assumes the position detection role; there are two positioning control electrodes per pole i.e. the polar electrode and the the circumpolar electrode farthest from the polar electrode. The positioning control signals are then no longer differentially applied between two circumpolar electrodes in relation to opposite poles but, depending on the direction of action, between the positioning control electrodes in relation to the same pole, or the opposite pole. This avoids, therefore, applying electrical charges to the floating ball when positioning it.

On a more general footing, the electrostatic return force generator is made up of a series of electrodes set out around the test weight such that the electrostatic forces that result from applying voltages or electrical charges to these electrodes give rise to a resultant in the opposite direction to the test weight displacement direction in the absence of these return forces.

SUMMARY OF THE INVENTION

Let $C_o$ be the test weight capacity with respect to the conducting surfaces at the ground reference potential; this potential is that of the apparatus body. Were the test weight electrically connected thereto, then it would be as if the capacity $C_o$ were infinite. By considering a system of n electrodes: $E_1, E_2 \ldots E_i \ldots E_n$ and by denoting:

$C_i$ as the capacity of the electrode $E_i$ with respect to the test weight $V_i$ as the potential of the electrode $E_i$ $Q$ as the electrical charge of the test weight, then the potential $V_o$ of the test weight may be expressed as:

$$V_o = \frac{Q + \sum_{i=1}^{n} C_i V_i}{C_o \sum_{i=1}^{n} C_i} \quad (1)$$

If it is assumed that the displacement of the test weight stems only from a translation and that this test weight is perfectly spherical, then the capacities $C_i$ are solely dependent on the coordinates of the test weight center in a trihedral of reference associated with the accelerometer. Under these conditions, if $\nabla$ designates the gradient operator applied to the capacities, the electrostatic force is given by:

$$\vec{F} = \tfrac{1}{2} \sum_{i=1}^{n} \vec{\nabla} C_i (V_i - V_o)^2 \quad (2)$$

Determination of the electrostatic force $\vec{F}$ consequently requires, in addition to the measurements of the potentials $V_i$, knowing the values of the gradients $\vec{\nabla} C_i$ and the potential $V_o$ of the test weight.

The invention concerns the determination of the gradients $\vec{\nabla} C_i$ on the one hand and the zero slaving of the potential $V_o$ on the other hand.

In accordance with the invention, the accelerometer comprises a test weight and an electrode system cooperating with the test weight, where this electrode system includes electrodes aligned in pairs along the three axes of a tri-rectangular trihedral and each one contributes both to detecting the test weight position and electrostatically controlling the positioning of the said weight and means for measuring the differences between the capacities of the position detection and positioning control electrodes forming the electrode pairs with respect to the test weight and it is characterized in that it further comprises means for measuring the sums of the position detection and positioning control electrode pair capacities with respect to the test weight as well as fixed additional electrodes serving to cancel the alternating potential of the test weight and a vibrating additional electrode serving to cancel the direct potential of the test weight.

BRIEF DESCRIPTION OF THE DRAWING

Other features and characteristics of the invention will become clearer upon reading the detailed description hereafter where reference is made to the appended drawings in which.

DESCRIPTION OF THE PREFERRED EMBODIMENT

Figure 1:
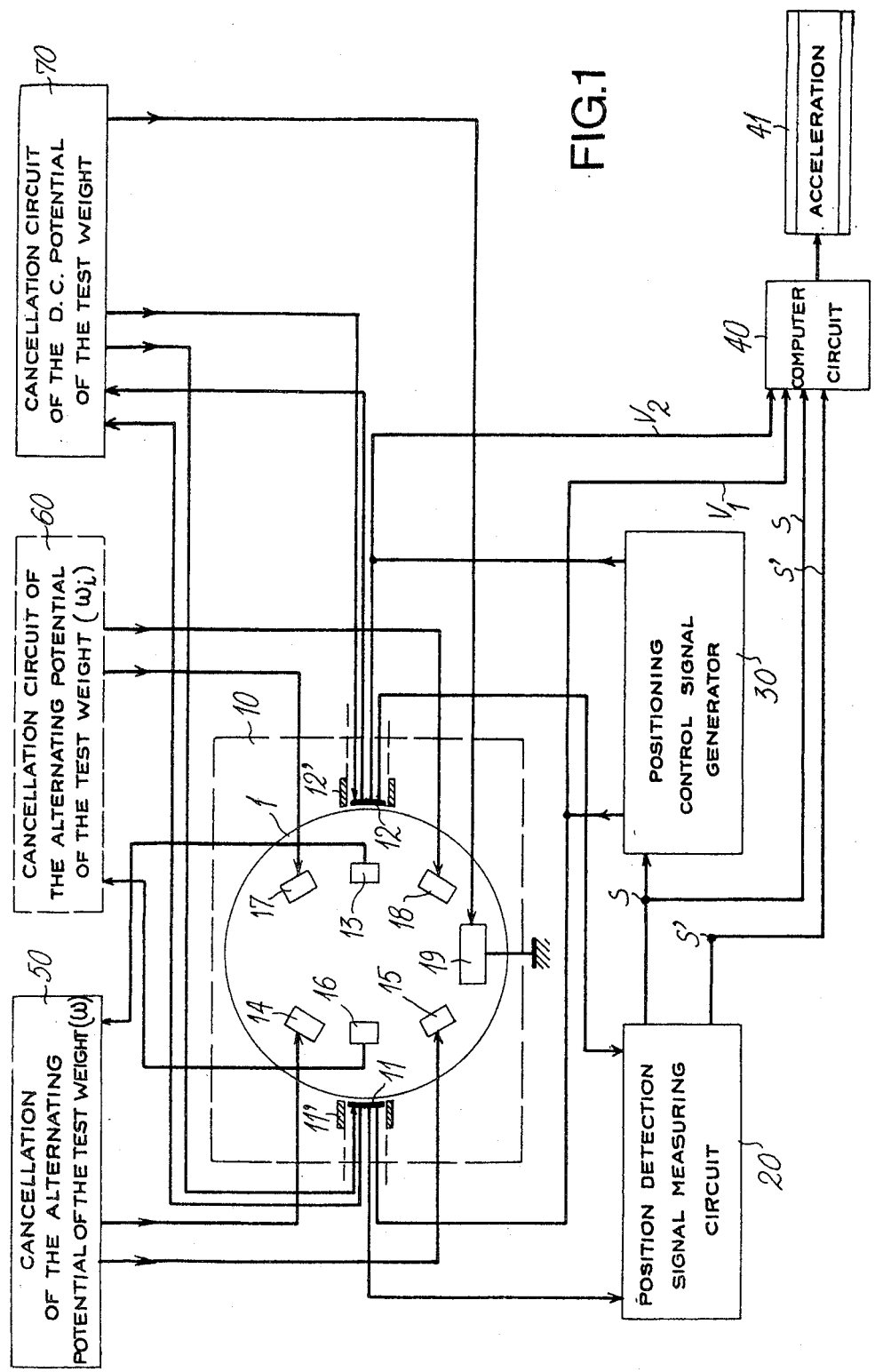
FIG. 1 is a block diagram representing an accelerometer in keeping with the invention.

With reference being made to FIG. 1, the block 10 represents the test weight 1 and electrodes of the accelerometer. The test weight 1 is assumed to be spherical and floats around in a cage that is also spherical. Three pairs of polar electrodes housed in the said cage are aligned in pairs along three axes making up a tri-rectangular trihedral and these electrodes with the test sphere create a series of capacitors. Each polar electrode fulfils the role, as already stated, of both the position detection electrode and the positioning control electrode. In FIG. 1, only the two electrodes in one and the same pair 11 and 12 have been depicted. Other electrodes 13 to 19 for other functions as will be explained hereinafter are also housed in the cage and cooperate with the test weight.

The electrodes 11 and 12 are connected to a position signal detection circuit 20. This circuit measures, in particular, the difference in capacities ($C_1-C_2$) between the test weight and the electrodes 11 and 12. It also measures the quantity $[(C_1+C_2)-C_R]$ where $C_R$ has a known capacitive value.

The differential signal ($C_1-C_2$) is fed into a circuit 30 for generating positioning control signals. The positioning control signals, produced by the circuit 30, are themselves applied to the electrodes 11 and 12. These positioning control signals can be either direct or alternating signals.

The quantity $[(C_1+C_2)-C_R]$ is transmitted to the computer circuit 40 which delivers the measured acceleration value to a measuring and display device 41.

An electrode 13 in the accelerometer electrode system is connected to a circuit 50 for cancelling the test weight alternating potential. The output of circuit 50 is wired up to the electrodes 14 and 15.

Should the positioning control signals be of the alternating type, then a second circuit 60 for cancelling the test weight alternating potential that is identical to the circuit 50 working, however, on another frequency is to be provided for. Its input is connected to the electrode 16 and its output to the electrodes 17 and 18.

A vibrating electrode 19 in the accelerometer electrode system makes up part of the test weight direct potential cancelling circuit 70. The input into the circuit 70 is connected to the position detection and positioning control electrodes 11-12 and the output to the same electrodes.

Figure 2:
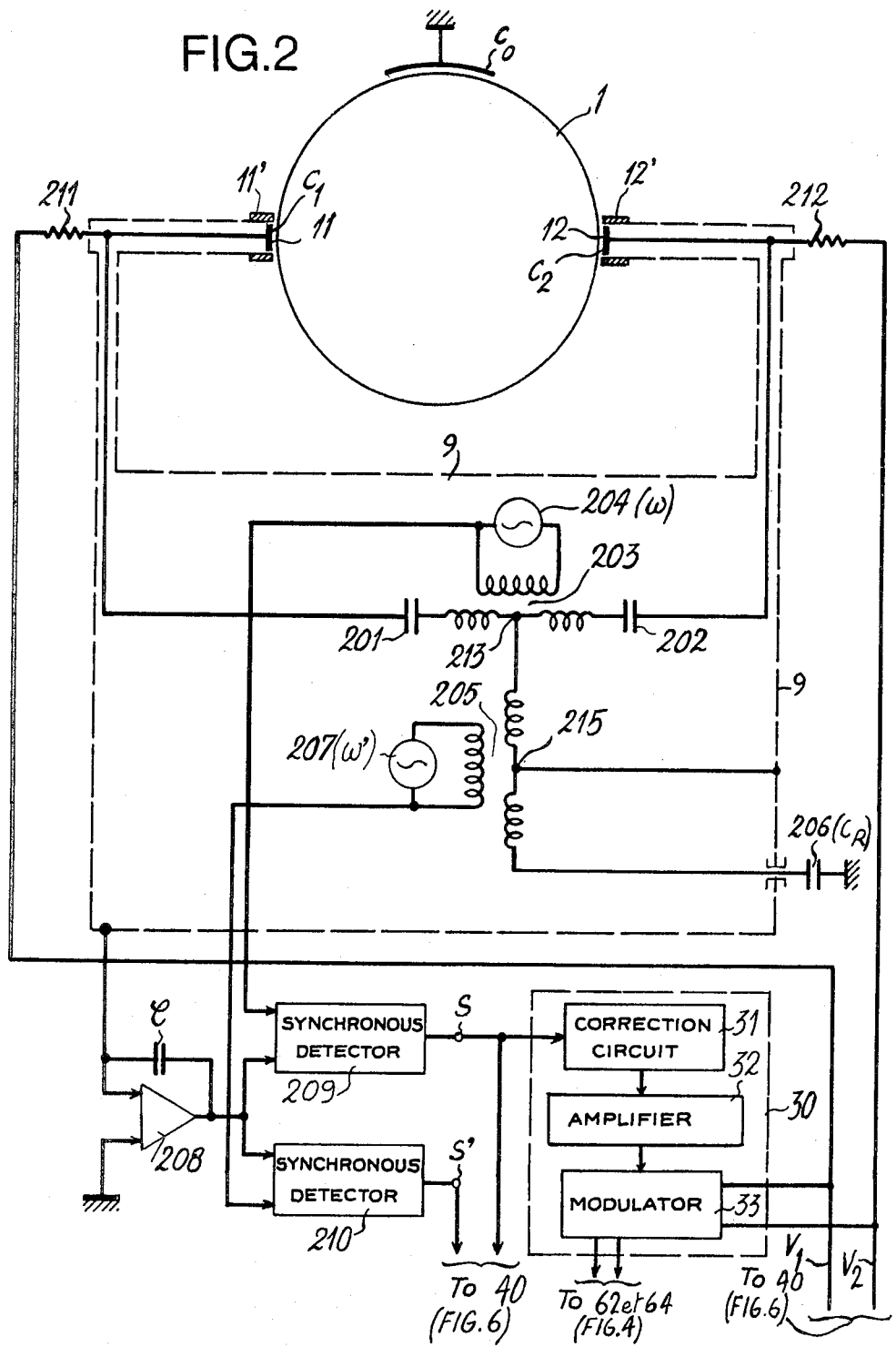
FIG. 2 depicts the circuit for measuring the position detection signals.

FIG. 2 depicts the position detection signal measurement circuit 20 in detail. The floating ball 1 and the electrodes 11 and 12 creating the capacities $C_1$ and $C_2$ with the ball 1 have been shown. Also shown is that part of the cage unprovided with electrodes which produces the capacity $C_o$ with the ball that is much greater than $C_1$ and $C_2$.

The electrodes 11 and 12 are connected via capacitors 201 and 202 to the secondary winding terminals of a differential transformer 203. The differential transformer primary winding is fed by an alternating source 204 with an angular frequency $\omega$. The center point 213 of the secondary winding in differential transformer 203 is connected to one of the secondary winding terminals of a second differential transformer 205. The other secondary winding terminal of the differential transformer 205 is grounded via a capacitor 206 with a known capacity $C_R$. The differential transformer 205 primary winding is fed by an alternating source 27 with an angular frequency $\omega'$.

The center point 215 of the differential transformer 205 is connected to the input of an operational amplifier 208 having a feedback capacity C. The output of this operational amplifier is connected to two synchronous detectors 209 and 210 that receive the signals with angular frequencies $\omega$ and $\omega'$ from the alternating sources 204 and 207 respectively.

The signals appearing at the output S of the synchronous detector 209 which is proportional to ($C_1-C_2$) is entered into the positioning control signal generator circuit 30.

Circuit 30 chiefly comprises a corrector unit 31 and a differential amplifier 32 as is described in the afore-mentioned U.S. Pat. No. 3,438,267 in the event of the positioning control signals being continuous. When the positioning control signals are of the alternating type with a frequency $\omega_i$, then the circuit 30 further comprises a modulator 33 having this frequency as its carrier frequency. The output of the positioning control signal generator 30 is connected to the electrodes 11 and 12 via resistors 211 and 212.

The signal appearing at the output S' and which is proportional to $[(C_1+C_2)-C_R]$ when the potential $V(\omega')$ of the ball at the frequency $\omega'$ is zero, is fed into the computer circuit 40.

To eliminate any errors in the acceleration measurement brought about by parasite capacities $C_{p1}$, $C_{p2}$, $C_{p3}$ between the electrodes and the conductors being at the ground potential, guard electrodes 11' and 12' envelop the position detection and positioning control electrodes 11 and 12. The electrodes 11' and 12' are linked up to a screen 9 which also envelops the alternating voltage sources and the transformers and is connected to the center point 215 of the transformer 205 secondary winding and to one input of operational amplifier 208.

If e represents the voltage amplitude at the secondary winding terminals of the differential transformers 203 and 205, then the input signals into the position detection signal measuring circuit 20 can be written:

$$S = \frac{C_o}{C_o + \sum_{i=1}^{n} C_i} [C_2 - C_1]e \tag{3}$$

$$S' = [(C_1 + C_2) - C_R]e - (C_1 - C_2)V(\omega') \tag{4}$$

where $$V(\omega') = \frac{C_1 + C_2}{C_o + \sum_{i=1}^{n} C_i} e \tag{5}$$

$V(\omega')$ refers to the amplitude of the test weight potential component at the frequency $\omega'$.

Equation (2) showed that the electrostatic force $\vec{F}$ proportional to the acceleration value sought after depends on $\vec{\nabla}C_i$ and $V_o$ and the equation (4) for $S'$ contains a troublesome parasite term $V(\omega')$.

Steps must therefore be taken to do away with the direct potential $V_o$ and the potential $V(\omega')$ at an angular frequency $\omega'$ of the test weight. If, furthermore, the positioning control signals are alternating with a frequency $\omega_i$, then the test weight potential at this frequency must also be eliminated.

The purpose of circuits 50, 60 and 70 is to cancel these potentials out by zero slaving.

Figure 3:
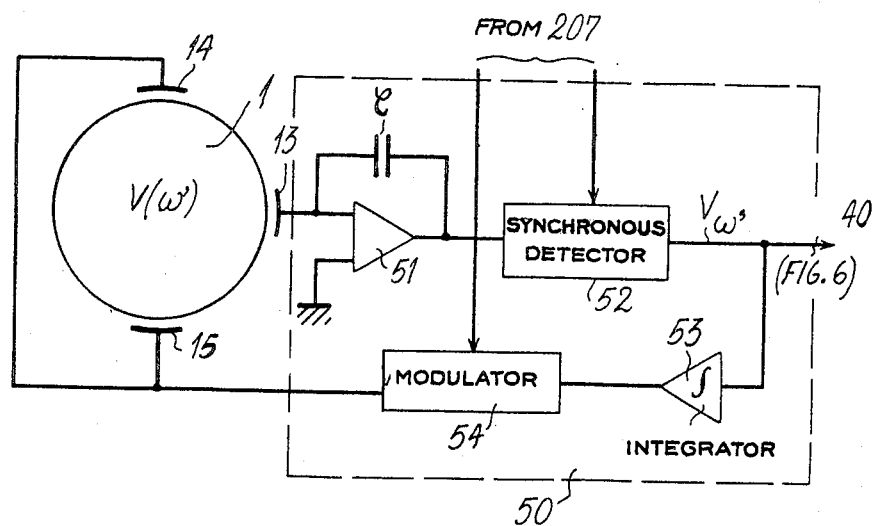
FIG. 3 depicts the system for cancelling an alternating potential component of the test weight.
Figure 4:
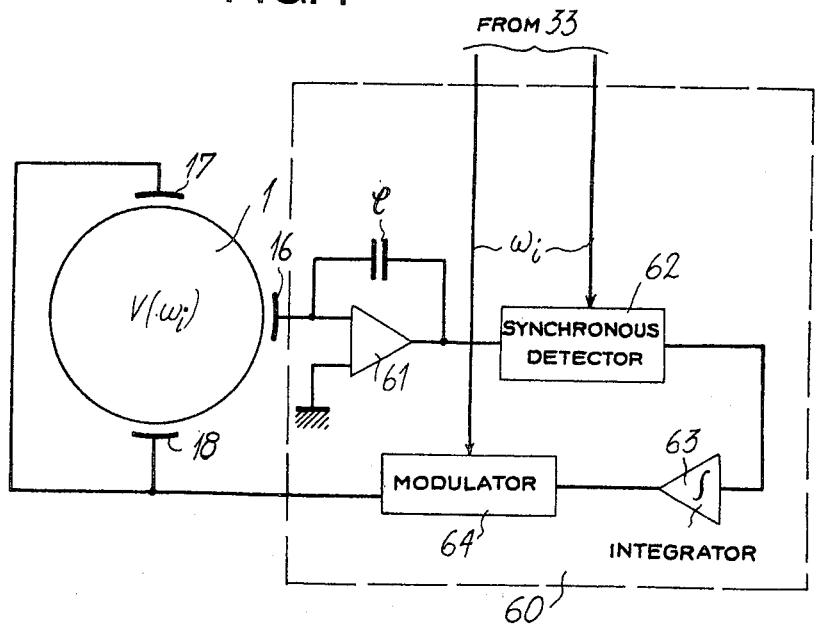
FIG. 4 depicts the system for cancelling another alternating potential component of the test weight, should the positioning control signals be alternating.

FIGS. 3 and 4 depict the circuit for cancelling out the test weight potential components at frequencies $\omega'$ (FIG. 3) and $\omega_i$ (FIG. 4).

The test weight alternating potentials captured by the electrode 13 or 16 is amplified in the operational amplifier 51 or 61 respectively and is detected in the synchronous detector 52 or 62. The detected signal is fed into the integrator 53 or 63 and from there into the modulator 54 or 64. The outgoing signal from the modulator 54 or 64 is simultaneously fed into the symmetrical electrodes 14 and 15 or 17 and 18.

The synchronous detector 52 and the modulator 54 receive a reference signal with a frequency $\omega'$ from the alternating source 207. The synchronous detector 62 and the modulator 64 receive a reference signal with a frequency $\omega_i$, which is the frequency of the positioning control signals, from the modulator 33 (FIG. 2).

It goes without saying that as the frequencies $\omega'$ and $\omega_i$ are independent, the two slaving operations must be performed by two separate chains such as those illustrated in FIGS. 3 and 4, one of which functions at the frequency $\omega'$ and the other at $\omega_i$.

Figure 5:
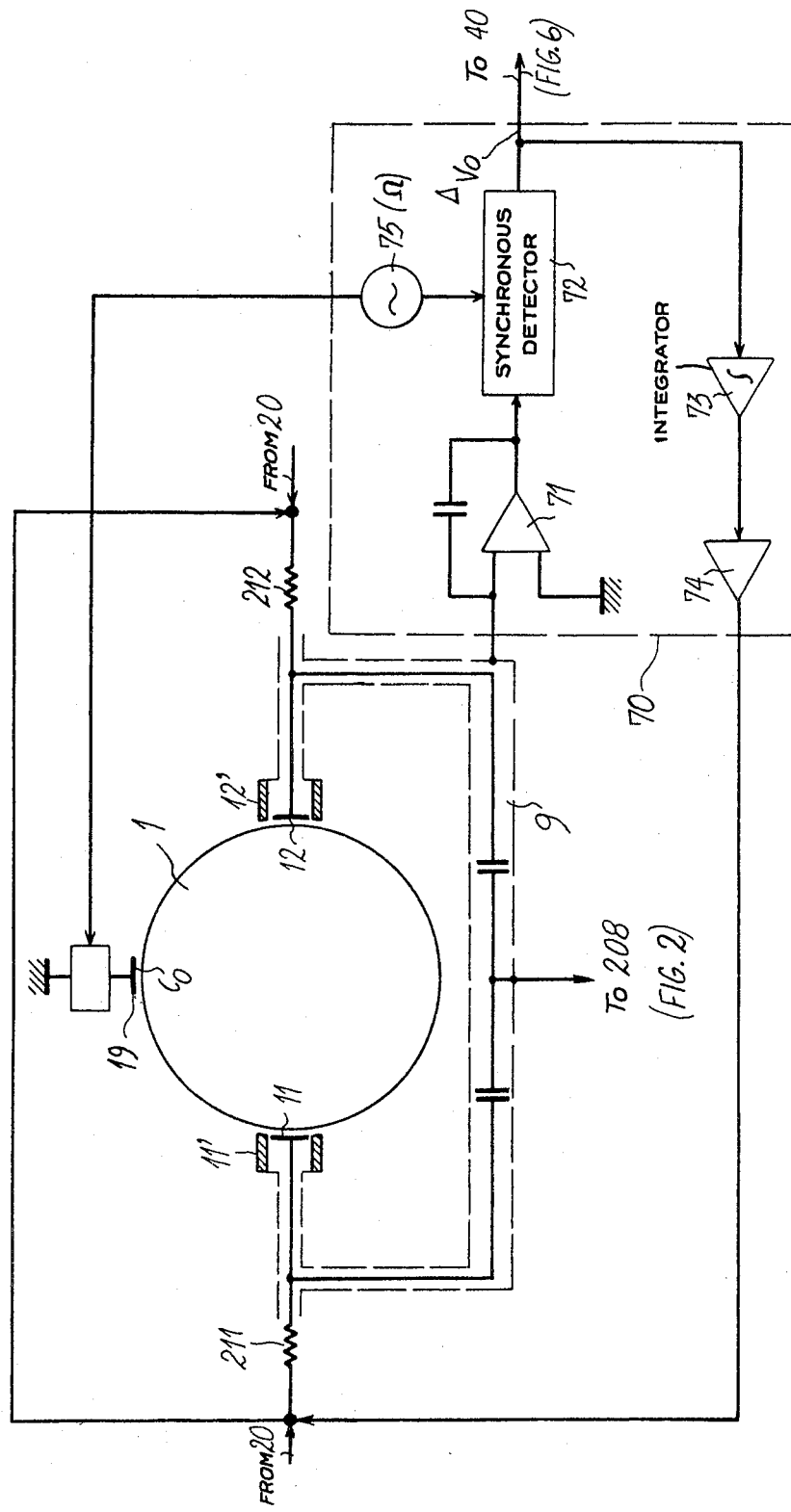
FIG. 5 depicts the system for cancelling the direct potential component of the test weight.

FIG. 5 represents the circuit that eliminates the direct component of the test weight potential.

Zero-slaving of the direct or slowly variable component of the test weight is similar in principle to that of FIGS. 3 and 4 except in that the measurement of this direct term cannot be carried out using a fixed electrode. A vibrating electrode must be employed.

The vibrating electrode 19 consists of a piezo-electric ceramic chip supplied by a source 75 of angular frequency $\Omega$. This electrode modulates the capacity $C_o$ and therefore the potential $V_o$ given by equation (1) which assumes the form:

$$V_o - \Delta V_o \sin \Omega t$$

$$\Delta V_o = V_o \frac{\Delta C_o}{C_o + \sum_{i=1}^{n} C_i}$$

The potential $\Delta V_o \sin \Omega t$ is picked up by the electrodes 11 and 12 and amplified by the operational amplifier 71 and detected in the synchronous detector 72. The detected signal is fed into the integrator 73 and from there into amplifier 74. The outgoing signal from the amplifier 74 is fed into the position detection and positioning control electrodes 11 and 12. Since there are three pairs of position detection and positioning control electrodes in a tri-dimensional accelerometer, it can be seen that one of these pairs also serves to cancel out the direct potential of the test weight.

Figure 6:
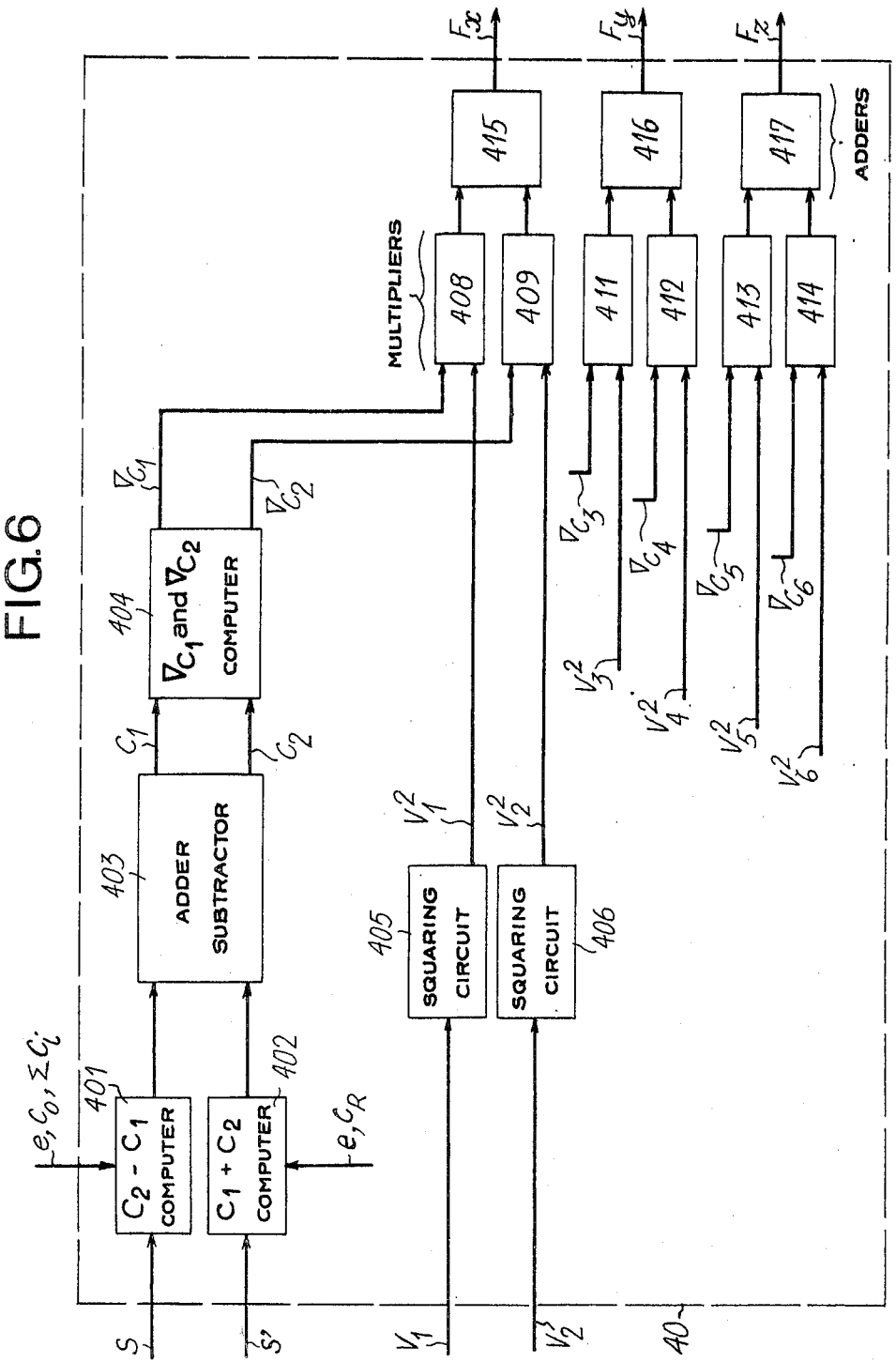
FIG. 6 depicts the calculation circuit giving the acceleration value.

FIG. 6 depicts the computer circuit 40. This circuit receives the following signals:
position detection signals S, S' (FIG. 2)
positioning control signals $V_1$, $V_2$ (FIG. 2) going to the electrodes 11 and 12 as well as the other position detection and positioning control signals coming from and going to the pairs of electrodes relative to the other co-ordinate axes.

The electrode cross-section will be assumed to be fairly small so that the "electrode/ball" capacitors may be likened to plane capacitors with a capacity given by:

$$C_i = \epsilon \sigma / x \qquad (6)$$

where $\epsilon$ is the permittivity, $\sigma$ the surface area and $x$ the variable height of the capacitors.

By differentiating equation (6) with respect to $x$, the following is obtained:

$$\frac{\partial C_i}{\partial x} = \frac{C_i^2}{\epsilon \sigma} \qquad (7)$$

The circuit 401 enables the difference $(C_1 - C_2)$ to be calculated, whilst the circuit 402 provides the sum $C_1 + C_2$. The adder/subtractor 403 delivers the signals that represents $C_1$ and $C_2$. These signals are squared in the squaring circuit 404. Signals are thus obtained proportional to $\nabla C_1$, $\nabla C_2$ and to equivalent quantities $\nabla C_3$, $\nabla C_4$, $\nabla C_5$ and $\nabla C_6$ in relation to the other electrode pairs.

The quantities $V_1$ and $V_2$ as well as the equivalent quantities $V_3$, $V_4$, $V_5$ and $V_6$ in relation to the other electrode pairs, are squared in the squaring circuit 405 and 406 and others not shown and the squares thus obtained are respectively multiplied by $\nabla C_1$ to $\nabla C_6$ in the multipliers 408 to 414 to give $\nabla C_1(V_1)^2$ to $\nabla C_6(V_6)^2$.

The adders 415 to 417 perform the following additions:

$$\nabla C_1(V_1)^2 + \nabla C_2(V_2)^2$$

$$\nabla C_3(V_3)^2 + \nabla C_4(V_4)^2$$

$$\nabla C_5(V_5)^2 + \nabla C_6(V_6)^2$$

and the signals leaving these adders are the components $F_x$, $F_y$ and $F_z$ respectively of the electrostatic force $\vec{F}$.

What I claim is:

1. Electrostatic accelerometer comprising:
an electrically conducting test weight;
a cage in which said test weight is located;
a system of electrodes for suspending said test weight located in said cage at the points where the axes of a coordinate tri-rectangular trihedral meet the cage and associated by pairs of electrodes located along given coordinate axes of said trihedral, said electrodes forming with said conducting test weight pairs of variable capacitors, each pair relating to one coordinate axis;
a least a measurement circuit of the capacities of a pair of electrodes relating to one coordinate axis;
at least a generator of electrostatic positioning control signals of the test weight along said coordinate axis, driven by said measurement circuit and connected to the pair of electrodes relating to said coordinate axis;
means for calculating the gradients of the measured capacities of said pair of electrodes;
means for squaring said positioning control signals relating to said pair of electrodes; and
means for multiplying said gradient by said squared signals.

2. Electrostatic accelerometer according to claim 1, comprising three measurement circuits respectively measuring the capacities of the three pairs of electrodes relating to the three coordinate axes, three generators of electrostatic positioning control signals of the test weight along the three coordinates axes, respectively driven by said three measurement circuits and connected to said three pairs of electrodes, means for calculating the gradients of the measured capacities of the three pairs of electrodes, means for squaring said positioning control signals relating to said three pairs of electrodes and means for multiplying said gradients by said squared signals.

3. Electrostatic accelerometer according to claim 1 further comprising means for cancelling out the test weight potential direct component.

4. Electrostatic accelerometer according to claim 1, in which the measurement circuit of the capacities of said pair of electrodes relating to one coordinate axis comprises a first capacitor bridge fed by a first alternating reference signal and including two fixed capacities and the two variable capacitors formed by a pair of electrodes and the test weight, said first capacitor bridge giving this difference of said two variable capacitor capacities, a second capacitor bridge fed by a second alternating reference signal having a frequency different from the first capacitor bridge and including a further fixed capacitor and a capacitor formed by the said two variable capacitors in parallel, said second capacitor bridge giving the difference between the sum of said two variable capacitor capacities and the capacity of the further capacitor and adder subtractor means for deriving the capacity of each of said variable capacitor from the difference and sum thereof.

5. Electrostatic accelerometer according to claim 4, wherein the means for cancelling out the test weight potential direct component comprises a vibrating electrode co-operating with the test weight, first capacitive means for picking up the test weight potential at the vibrating frequency of said vibrating electrode, means for detecting the signal at the vibrating frequency picked up by said first capacitive means and second capacitive means for applying the output signal of said detecting means to said test weight.

6. Electrostatic accelerometer according to claim 5 wherein the second capacitive means are formed by at least one of the pair of electrodes located along any coordinate axis of the trihedral.

7. Electrostatic accelerometer according to claim 4 further comprising means for cancelling out the test weight potential component at the frequency of the reference signal feeding the second capacitor bridge.

8. Electrostatic accelerometer according to claim 7 wherein the means for cancelling the test weight potential component at the frequency of the reference signal feeding the second capacitor bridge comprises third capacitive means for picking up the test weight potential at said reference signal frequency, means for detecting the picked up signal at said reference signal frequency and fourth capacitive means for applying the output of said detecting means to said test weight.

9. Electrostatic accelerometer according to claim 8 wherein the third and fourth capacitive means are formed by a pair of electrodes located along a coordinate axis of the trihedral.

* * * * *